United States Patent
Kong et al.

(10) Patent No.: US 10,649,905 B2
(45) Date of Patent: May 12, 2020

(54) METHOD AND APPARATUS FOR STORING DATA

(71) Applicant: BEIJING BAIDU NETCOM SCIENCE AND TECHNOLOGY CO., LTD., Beijing (CN)

(72) Inventors: Zhi Kong, Beijing (CN); Boxue Yin, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/751,072

(22) PCT Filed: Jun. 20, 2016

(86) PCT No.: PCT/CN2016/086343
§ 371 (c)(1),
(2) Date: Feb. 7, 2018

(87) PCT Pub. No.: WO2017/117919
PCT Pub. Date: Jul. 13, 2017

(65) Prior Publication Data
US 2018/0300250 A1    Oct. 18, 2018

(30) Foreign Application Priority Data
Jan. 4, 2016    (CN) .......................... 2016 1 0006693

(51) Int. Cl.
*G06F 12/00*    (2006.01)
*G06F 13/00*    (2006.01)
(Continued)

(52) U.S. Cl.
CPC ...... *G06F 12/0875* (2013.01); *G06F 12/0882* (2013.01); *G06F 16/2282* (2019.01);
(Continued)

(58) Field of Classification Search
CPC .......................... G06F 12/0893; G06F 12/1045
(Continued)

(56) References Cited

U.S. PATENT DOCUMENTS

2002/0191772 A1* 12/2002 Creamer ............. H04L 41/5054
379/221.08
2007/0255759 A1    11/2007 Akelbein et al.
(Continued)

FOREIGN PATENT DOCUMENTS

CN           1996311 A       7/2007
CN         102609360 A       7/2012
(Continued)

OTHER PUBLICATIONS

PCT/CN2016/086343 English translation of International Search Report dated Oct. 8, 2016.

*Primary Examiner* — Edward J Dudek, Jr.
*Assistant Examiner* — Sidney Li
(74) *Attorney, Agent, or Firm* — Lathrop GPM LLP

(57) ABSTRACT

The present disclosure discloses a method and apparatus for storing data. A specific embodiment of the method includes: judging whether a remaining storage space in a compressed data page is greater than a storage space threshold, in response to to-be-stored data to be written to the compressed data page in a cache storage region of a database; if not, determining a non-compressed data page among the non-compressed data pages for generating the compressed data page; and compressing the determined non-compressed data page to generate the compressed data page. This embodiment achieves the generation of the compressed data page in advance, such that each time the data is written to the compressed data page, it is ensured that there is enough storage space in the compressed data page to store the written data, thus reducing the system overhead when writ-
(Continued)

ing the data to the compressed data page, enhancing the writing efficiency of the system.

12 Claims, 5 Drawing Sheets

(51) Int. Cl.
  *G06F 13/28* (2006.01)
  *G06F 12/0875* (2016.01)
  *G06F 16/22* (2019.01)
  *G06F 16/2455* (2019.01)
  *G06F 12/0882* (2016.01)
  *G06F 12/0893* (2016.01)
  *G06F 12/1045* (2016.01)
(52) U.S. Cl.
  CPC .... *G06F 16/24552* (2019.01); *G06F 12/0893* (2013.01); *G06F 12/1045* (2013.01); *G06F 2212/1016* (2013.01); *G06F 2212/401* (2013.01); *G06F 2212/45* (2013.01)

(58) Field of Classification Search
  USPC .......................................................... 711/118
  See application file for complete search history.

(56) References Cited

U.S. PATENT DOCUMENTS

| | | | |
|---|---|---|---|
| 2008/0183949 A1* | 7/2008 | Ly .................. | G06F 12/0246 711/103 |
| 2009/0112949 A1 | 4/2009 | Wernikoff | |
| 2014/0143517 A1 | 5/2014 | Jin et al. | |
| 2015/0067258 A1* | 3/2015 | Jung .................. | G06F 12/0868 711/119 |
| 2015/0242432 A1* | 8/2015 | Bak .................. | G06F 12/1009 707/693 |

FOREIGN PATENT DOCUMENTS

| | | |
|---|---|---|
| CN | 103744627 A | 4/2014 |
| CN | 104461933 A | 3/2015 |

* cited by examiner

METHOD AND APPARATUS FOR STORING DATA

CROSS-REFERENCE TO RELATED APPLICATION

This application claims the priority of Chinese Patent Application No. 201610006693.4, filed on Jan. 4, 2016, the content of which is incorporated herein by reference in its entirety.

TECHNICAL FIELD

The present disclosure relates to the field of computer technology, specifically to the field of database, and more specifically to a method and apparatus for storing data.

BACKGROUND

In accessing a database, hot data having a high access frequency is usually stored in a cache storage region of the database. At the same time, the hot data may be stored in a compressed data page of the cache storage region after compression, so that more hot data is stored in the cache storage region and the hit ratio of the hot data is further increased. At present, the commonly used method is to directly write data to a compressed data page, and to compress a non-compressed data page to generate a new compressed data page only when the remaining storage space of the compressed data page is insufficient.

However, when data is written to the compressed data page using the above method, on the one hand, since the non-compressed data page is compressed to generate the new compressed data page, it will lead to a suspension of a thread writing hot data to the compressed data page, and an increase of the system overhead. On the other hand, when the generation of a new compressed data page fails, it will lead to page splitting; since page splitting needs to require a locking operation on a data structure that describes the relationship between data pages, concurrent waiting is caused and the system overhead is further increased.

SUMMARY

The present disclosure provides a method and apparatus for storing data, in order to solve the technical problem mentioned in the foregoing Background section.

In a first aspect, the present disclosure provides a method for storing data, the method including: judging whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data; if not, determining a non-compressed data page among the non-compressed data pages for generating the compressed data page; and compressing the determined non-compressed data page to generate the compressed data page, such that the to-be-stored data is stored using the generated compressed data page when the to-be-stored data is written to the compressed data page next time.

In a second aspect, the present disclosure provides an apparatus for storing data, the apparatus including: a responding unit, configured to judge whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data; a determining unit, configured to determine a non-compressed data page among the non-compressed data pages for generating the compressed data page, when the remaining storage space in the compressed data page is smaller than the storage space threshold; and a compression unit, configured to compress the determined non-compressed data page to generate the compressed data page, such that the to-be-stored data is stored using the generated compressed data page when the to-be-stored data is written to the compressed data page next time.

By judging whether a remaining storage space in a compressed data page is greater than a storage space threshold, in response to to-be-stored data to be written to the compressed data page in a cache storage region of a database; if not, determining a non-compressed data page among the non-compressed data pages for generating the compressed data page; and compressing the determined non-compressed data page to generate the compressed data page, such that the to-be-stored data is stored using the generated compressed data page when the to-be-stored data is written to the compressed data page next time, the method and apparatus for storing data provided by the present disclosure achieves the generation of the compressed data page in advance, such that each time the data is written to the compressed data page, the compressed data page is ensured to have enough storage space to store the written data, thus reducing the system overhead when writing the data to the compressed data page, enhancing the writing efficiency of the system.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
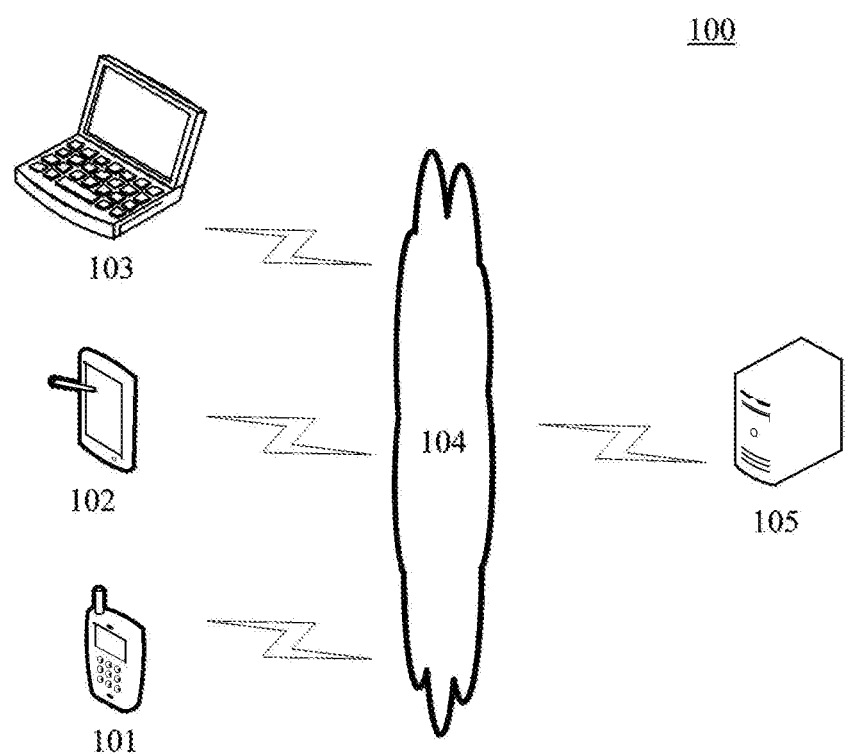
FIG. 1 is an exemplary system architecture diagram in which the present disclosure may be applied.

FIG. 1 shows an exemplary architecture of a system 100 to which the method for storing data or the apparatus for storing data according to an embodiment of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as network security applications and instant messaging tools may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a server in the backend providing support for data access for the terminal devices 101, 102 or 103. The server may perform a processing on the received request for accessing data, and return a processing result (for example, data in a database) to the terminal devices.

It should be appreciated that the numbers of the terminal devices, the networks and the servers in FIG. 1 are merely illustrative. Any number of terminal devices, networks and servers may be provided based on the actual requirements.

Figure 2:
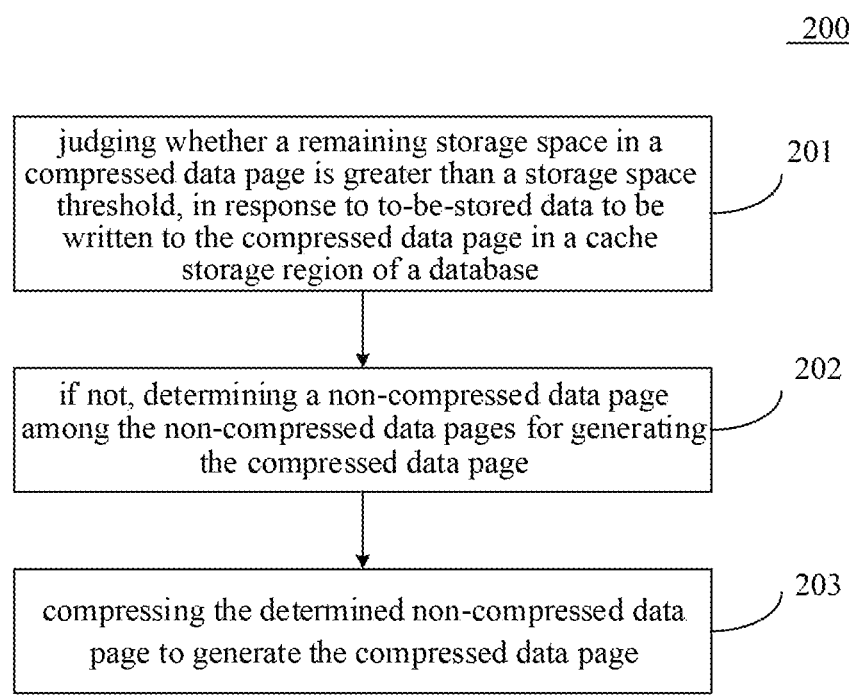
FIG. 2 is a flowchart of an embodiment of a method for storing data according to the present disclosure.

With reference to FIG. 2, which shows a flow 200 of an embodiment of a method according for storing data to the present disclosure. It needs to be noted that the method for storing data provided by the embodiments of the present disclosure is generally executed by the server 105 in FIG. 1, accordingly, the apparatus for storing data is generally provided in the server 105. The method includes the following steps:

In Step 201, whether a remaining storage space in a compressed data page is greater than a storage space threshold, is judged in response to to-be-stored data to be written to the compressed data page in a cache storage region of a database.

In the present embodiment, the cache storage region includes: non-compressed data pages for storing the to-be-stored data and compressed data pages for storing compressed data corresponding to the to-be-stored data. The cache storage region may be a storage region for storing frequently accessed data of the user (which may also be referred to as hot data) during access process to a database, and the cache storage region may also be referred to as a buffer pool. In the present embodiment, since each time data is stored, i.e., data is written to the data table, writing is performed in units of records. Therefore, the size of the storage space threshold may be the storage space occupied by the record currently written to the data table occupying the largest storage space.

In the present embodiment, data in the compressed data page may include: compressed data and non-compressed mlog written in an additive writing mode. First, the principle of setting a compressed data page in the buffer pool is illustrated as follow: in order to enhance the hit probability to the hot data in the buffer pool, i.e., read the probability of the hot data in the buffer pool through one read operation, the buffer pool may be divided into compressed data pages for storing compressed data generated after compressing the to-be-stored data and non-compressed data pages. Thus, the hot data may be compressed and stored in the compressed data pages, such that the buffer pool may cache more hot data and the hit probability to the hot data is improved. When reading the compressed hot data, the decompression operation may be performed to obtain the decompressed hot data. In the present embodiment, the most recently accessed data may be stored in the non-compressed data pages, and at the same time, data other than the most recently accessed data may be stored in the compressed data pages to store more hot data in the buffer pool, and improve the hit probability to the hot data.

In the present embodiment, a compressed data page link list and a non-compressed data page link list may be respectively created in advance, and the compressed data page link list and the non-compressed data page link list are used to respectively manage the compressed data pages and the non-compressed data pages. Both the compressed data page link list and the non-compressed data page link list may be implemented utilizing a LRU (Least Recently Used) link list. Taking the compressed data page link list as an example, each node in the link list corresponds to a compressed data page. The node may record a pointer indicating a storage address of a compressed data page preceding the compressed data page, a pointer of a storage address of a compressed data page subsequent to the compressed data page, and the actual physical address of the compressed data page.

In some alternative implementations of the present embodiment, the method further including: receiving an input storage space setting instruction; and setting a storage space size for the non-compressed data page and the compressed data page. In the present embodiment, the storage space size occupied by the compressed data page and the non-compressed data page may be set. For example, setting the size of a non-compressed data page to 16 KB, and the compressed data page may also be referred to as a normal non-compressed data page. Assuming the size of the normal non-compressed data page is 16 KB, 20 non-compressed data pages are stored in the buffer pool, in the case of the compression, when the size of a compressed data page is 8 KB, then the buffer pool may store 38 data pages, here, the buffer pool includes one non-compressed data page and 37 compressed data pages, the non-compressed data page is a non-compressed data page in the non-compressed data page link list, and the storage space occupied by the non-compressed data page may be equivalent to 1.5 normal non-compressed data pages. Therefore, in the case that the size of the cache storage region is the same, the number of the data pages is increased by compression, and the hit probability to the hot data is improved.

In Step 202, if not, a non-compressed data page among the non-compressed data pages for generating the compressed data page is determined.

In the present embodiment, when judging the remaining storage space in the compressed data page is smaller than the storage space threshold, a non-compressed data page among the non-compressed data pages for generating the compressed data page may be further determined.

In some alternative implementations of the present embodiment, selecting a compression thread for compressing the non-compressed data page to generate the compressed data page from pre-created compression threads, when the remaining storage space in the compressed data page is smaller than the storage space threshold.

In the present embodiment, a plurality of compression threads may be pre-created, and when the remaining storage space in the compressed data page is smaller than the storage space threshold, an idle compression thread is selected from the pre-created compressed threads. Then, the idle compression thread is used to compress the non-compressed data page to generate the compressed data page.

Figure 3:
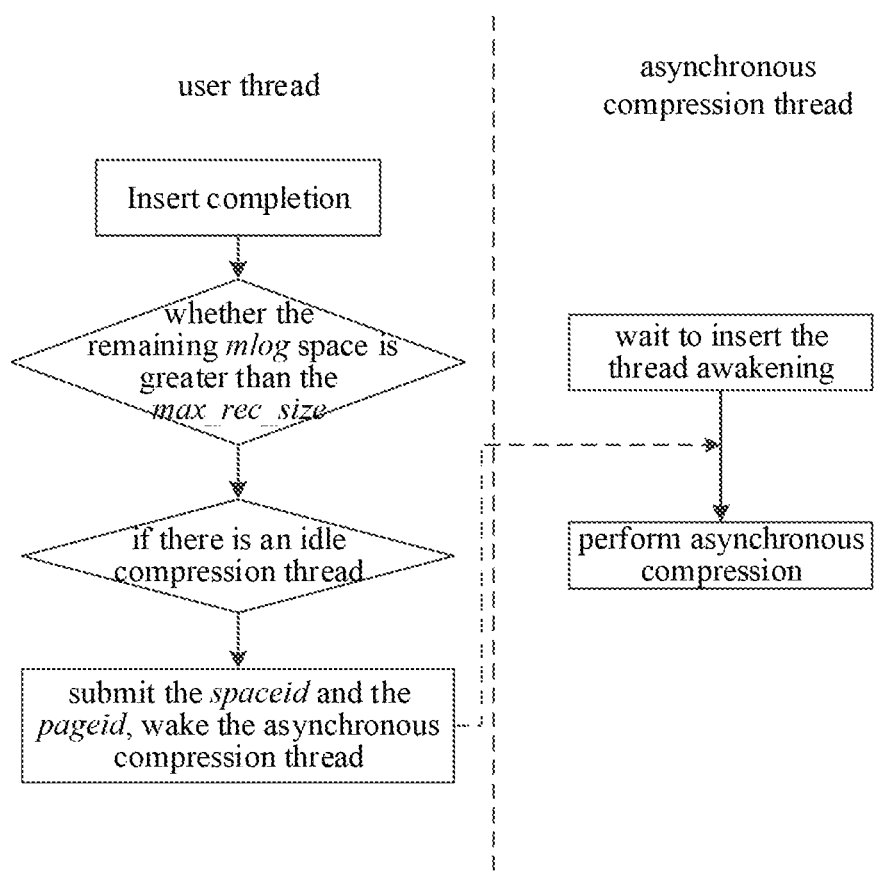
FIG. 3 shows a schematic diagram of compressing using an idle compression thread.

With reference to FIG. 3, which shows a schematic diagram of compressing using an idle compression thread.

In FIG. 3, a user thread for writing data to a compressed data page and an asynchronous compression thread for compressing a non-compressed data page are shown. After writing data to the compressed data page, that is, after the insert operation is completed, the user thread may determine whether the remaining storage space of the compressed data page, i.e., the mlog space, is greater than the storage space threshold, i.e., the max_rec_size. The max_rec_size may be the storage space occupied by the record currently written to the data table occupying the largest storage space. When it is determined that the remaining storage space of the compressed data page is smaller than the storage space threshold, for example, smaller than the storage space occupied by the record currently written to the data table occupying the largest storage space, it may be found if there is an idle compression thread. When it is determined that there is an idle compression thread, a signal may be signaled to wake the idle compression thread. At the same time, the spaceid parameter and the pageid parameter may be submitted to the compression thread. The spaceid parameter may be an identifier for a database file, and the pageid parameter may be used to represent an offset in the database file in data pages. Thus, the idle compression thread may find non-compressed data pages for generating compressed data pages based on the spaceid parameter and the pageid parameter.

In some alternative implementations of the present embodiment, the determining a non-compressed data page among the non-compressed data pages for generating the compressed data page includes: receiving a compression request by using the compression thread, the compression request including a data page identifier; and when the data page identifier exists in the non-compressed data page link list and the non-compressed data page corresponding to the data page identifier has not been compressed, the non-compressed data page is determined as the non-compressed data page for generating the compressed data page, wherein the non-compressed data page link list includes a plurality of nodes, and each node corresponds to the data page identifier of the non-compressed data page.

Figure 4:
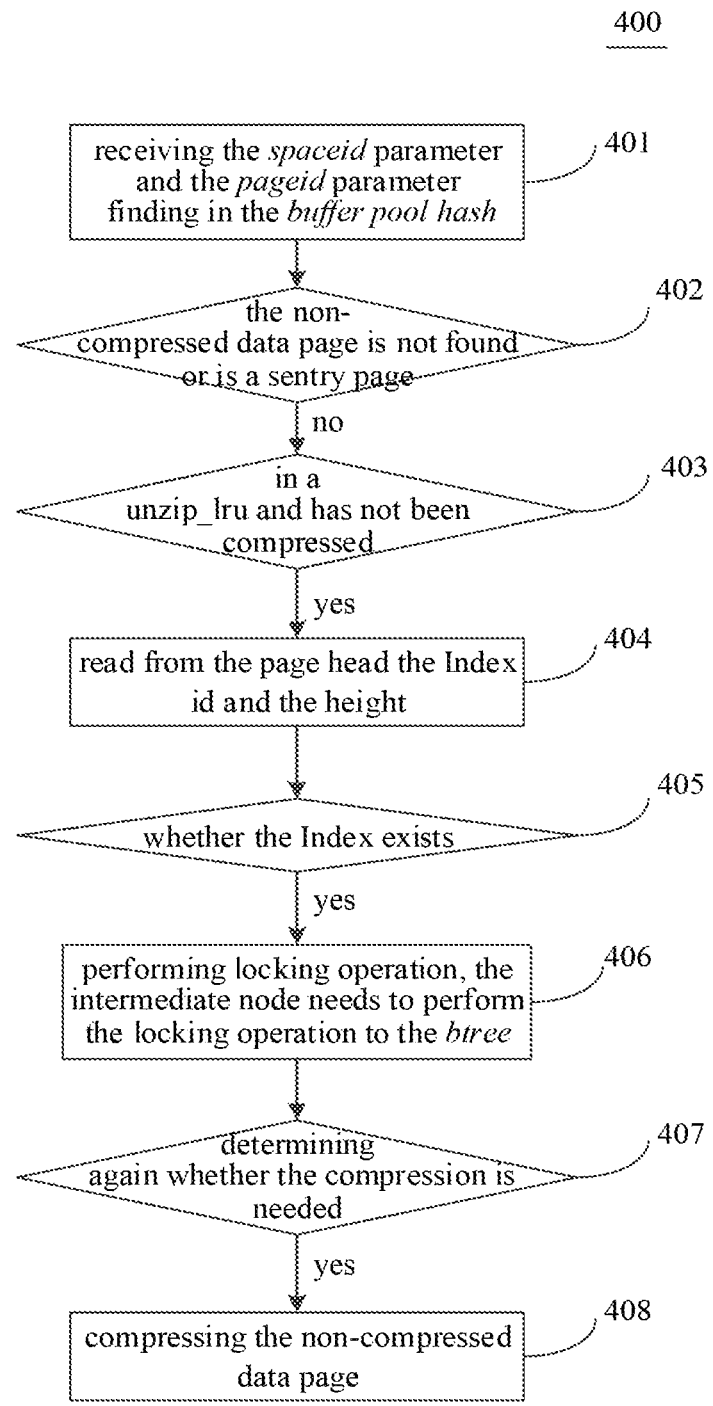
FIG. 4 shows a flowchart of compressing a non-compressed data page.

With reference to FIG. 4, which shows a flowchart of compressing a non-compressed data page.

In Step 401, the spaceid parameter and the pageid parameter submitted by the user thread are received using an idle compression thread. The storage space size parameter may be an identifier for a database file, and the pageid parameter may be used to represent an offset in the database file in data pages. A key of the buffer pool hash in the buffer pool may be generated, based on the parameter and the pageid parameter. In the buffer pool hash, the value corresponding to the key may be a pointer indicating the storage location of the non-compressed data page. Thus, it may be further found out whether a non-compressed data page corresponding to the key exists in the buffer pool hash.

In Step 402, whether the non-compressed data page is not found or is a sentry page is determined.

In Step 403, whether the non-compressed data page is in a non-compressed data page link list, i.e., an unzip_lru link list in the buffer pool, and has not been compressed is determined, when the non-compressed data page is found and the non-compressed data page is not a sentry page.

In Step 404, when it is determined that the non-compressed data page is in the non-compressed data page link list in the buffer pool and has not been compressed, an Index id parameter and a height parameter may be acquired from the page head of the non-compressed data page. When acquiring the definition of the Index and the height parameter, the Index id parameter may be used to acquire the definition of the Index, and the height parameter may be used to determine whether it is a leaf node.

In Step 405, whether the Index exists, i.e., whether the definition of the Index is in the cache is determined.

In Step 406, when the Index exists, a locking operation is performed, and because the relation between all the data pages in the database may be represented using a btree data structure, the locking operation needs to be performed on the entire btree when processing the intermediate node of the btree.

In Step 407, whether the compression is needed is determined again, i.e., determine whether the non-compressed data page has been processed by other compression threads within a period from finding the non-compressed data page till the current time.

In Step 408, when it is determined that the compression is needed, the non-compressed data page is compressed to generate the compressed data page.

In Step 203, the determined non-compressed data page is compressed to generate the compressed data page.

In the present embodiment, when the non-compressed data page for generating the compressed data page is determined, the non-compressed data page may be compressed to generate the compressed data page.

In some alternative implementations of the present embodiment, after responding to the to-be-stored data to be written to the compressed data page in a cache storage region of a database, the method further including: writing the to-be-stored data to a preset non-compressed data page among the non-compressed data pages.

In the present embodiment, after the data is successfully written to the compressed data page, the data may be written to a corresponding non-compressed data page, which may be a pre-selected non-compressed data page in the non-compressed data page link list. Thus, when reading the data, the decompression operation is not necessary.

The difference between the method of writing data to a compressed data page in the present embodiment and the prior art is illustrated: in the prior art, only when the remaining storage space in the compressed data page is not enough for writing in a record, a non-compressed data page is compressed to generate a new compressed data page. On the one hand, since the non-compressed data page is compressed to generate the new compressed data page, it will lead to a suspension of a thread writing data to the compressed data page, and an increase of the system overhead. On the other hand, when the generation of a new compressed data page fails, it will lead to page splitting; since page splitting needs to require a locking operation on a data structure that describes the relationship between data pages, concurrent waiting is caused and the system overhead is further increased, reducing the writing efficiency of the entire system. however, in the present embodiment, in order to prevent writing data directly to the compressed data page, i.e., the compressed data page cannot provide enough space to store the written data, the non-compressed data page may be compressed in advance. In this way, each time the data is written to the compressed data page, it is ensured that there is enough space in the compressed data page to store the written data, thus reducing the system overhead when writing the data to the compressed data page, and enhancing the writing efficiency of the system.

Figure 5:
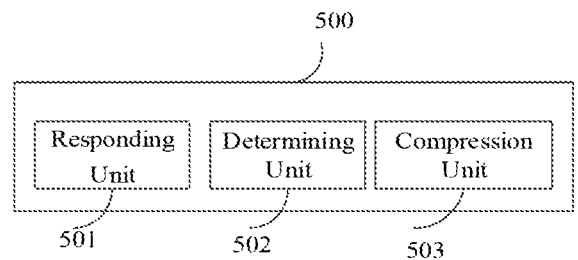
FIG. 5 is a schematic structural diagram of an embodiment of an apparatus for storing data according to the present disclosure.

With further reference to FIG. 5, an embodiment of an apparatus for storing data adapted to implement the methods described in the above figures is provided by the present application. The embodiment of the apparatus corresponds to the method embodiment shown in FIG. 2. The apparatus may be applied in various electronic devices.

Referring to FIG. 5, the apparatus 500 for storing data of the present embodiment includes: a responding unit 501, a determining unit 502, and a compression unit 503. Here, the responding unit 501 is configured to judge whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data. The determining unit 502 is configured to determine a non-compressed data page among the non-compressed data pages for generating the compressed data page, when the remaining storage space in the compressed data page is smaller than the storage space threshold. The compression unit 503 is configured to compress the determined non-compressed data page to generate the compressed data page, such that the to-be-stored data is stored using the generated compressed data page when the to-be-stored data is written to the compressed data page next time.

In the present embodiment, the responding unit 501 may judge whether a remaining storage space in a compressed data page is greater than a storage space threshold, in response to to-be-stored data to be written to the compressed data page in a cache storage region of a database. The cache storage region may be a storage region for storing hot data during access process to a database. The size of the storage space threshold may be the length of the longest record written in a data table.

In the present embodiment, when the remaining storage space in the compressed data page is smaller than the storage space threshold, the determining unit 502 may determine a non-compressed data page among the non-compressed data pages for generating the compressed data page.

In the present embodiment, after determining the non-compressed data page for generating the compressed data page by the determining unit 502, the compression unit 503 may compress the determined non-compressed data page to generate the compressed data page.

In some alternative implementations of the present embodiment, the apparatus 500 further includes: a selection unit (not shown), configured to select a compression thread for compressing the non-compressed data page to generate the compressed data page from pre-created compression threads, when the remaining storage space in the compressed data page is smaller than the storage space threshold.

In some alternative implementations of the present embodiment, the determining unit 502 includes: a compression request receiving subunit (not shown), configured to receive a compression request using the compression thread, the compression request including a data page identifier; and a non-compressed data page determining subunit (not shown), configured to determine the non-compressed data page as the non-compressed data page for generating the compressed data page, when the data page identifier exists in a non-compressed data page link list and the non-compressed data page corresponding to the data page identifier is not compressed before, wherein the non-compressed data page link list includes a plurality of nodes, and each of the nodes corresponds to the data page identifier of the non-compressed data page.

In some alternative implementations of the present embodiment, the apparatus 500 further includes: a writing unit (not shown), configured to write the to-be-stored data to a preset non-compressed data page among the non-compressed data pages, after responding to the to-be-stored data to be written to the compressed data page in a cache storage region of a database.

In some alternative implementations of the present embodiment, the apparatus 500 further includes: an instruction receiving unit (not shown), configured to receive an input storage space setting instruction; and a setting unit (not shown), configured to set a storage space size for the non-compressed data page and the compressed data page.

It should be appreciated by those skilled in the art that the above apparatus 500 for storing data further includes some other well-known structures such as a processor, a memory, and these well-known structures are not shown in FIG. 5 in order not to unnecessarily obscure the embodiments of the present disclosure.

Figure 6:
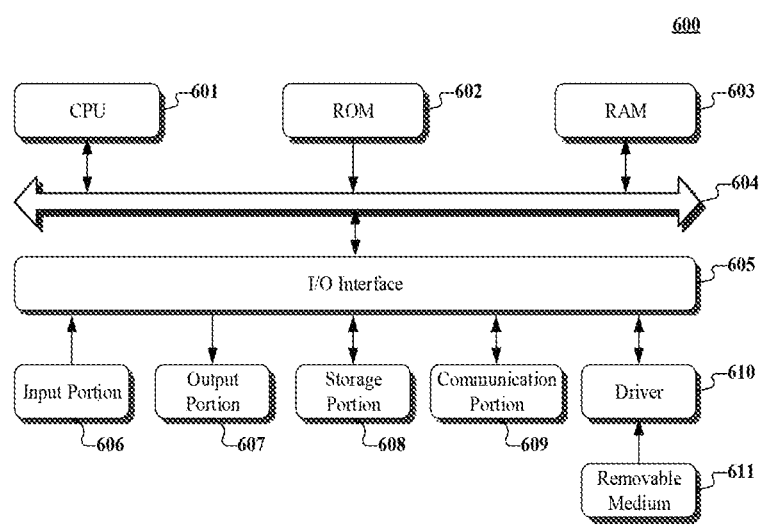
FIG. 6 is a schematic structural diagram of a computer system adapted to implement a terminal device or a server of embodiments of the present disclosure.

Referring to FIG. 6, a schematic structural diagram of a computer system adapted to implement a terminal device or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: judge whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data; if not, determine a non-compressed data page among the non-compressed data pages for generating the compressed data page; and compress the determined non-compressed data page to generate the compressed data page, such that the to-be-stored data is stored using the generated compressed data page when the to-be-stored data is written to the compressed data page next time.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for storing data, the method comprising:
judging whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data, wherein the storage space threshold is greater than a size of a record being written to the compressed data page and occupying the smallest storage space among records stored in the compressed data page, each of the records stored in the compressed data page being compressed data written to the compressed data page during one write;
when the remaining storage space in the compressed data page is smaller than the storage space threshold, determining a non-compressed data page among the non-compressed data pages for generating second compressed data page; and
compressing the determined non-compressed data page to generate the second compressed data page, such that compressed data corresponding to the to-be-stored data is stored using the generated second compressed data page when compressed data corresponding to the to-be-stored data is written to the compressed data page next time.

2. The method according to claim 1, the method further comprising:
selecting a compression thread for compressing the non-compressed data page to generate the second compressed data page from pre-created compression threads, when the remaining storage space in the compressed data page is smaller than the storage space threshold.

3. The method according to claim 2, wherein the determining a non-compressed data page among the non-compressed data pages for generating second compressed data page comprises:
receiving a compression request using the compression thread, the compression request including a data page identifier; and
determining the non-compressed data page as the non-compressed data page for generating the second compressed data page, when the data page identifier exists in a non-compressed data page link list and the non-compressed data page corresponding to the data page identifier is not compressed before, wherein the non-compressed data page link list includes a plurality of nodes, and each of the plurality of nodes corresponds to one data page identifier of the non-compressed data page.

4. The method according to claim 3, after responding to the to-be-stored data to be written to the compressed data page in a cache storage region of a database, the method further comprising:
writing the to-be-stored data to a preset non-compressed data page among the non-compressed data pages.

5. The method according to claim 1, after responding to the to-be-stored data to be written to the compressed data page in a cache storage region of a database, the method further comprising: writing the to-be-stored data to a preset non-compressed data page among the non-compressed data pages.

6. The method according to claim 4, the method further comprising:

receiving an input storage space setting instruction; and setting a storage space size for the non-compressed data page and the compressed data page.

7. An apparatus for storing data, the apparatus comprising:

at least one processor; and a memory storing instructions, which when executed by the at least one processor, cause the at least one processor to perform operations, the operations comprising:

judging whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data, wherein the storage space threshold is greater than a size of a record being written to the compressed data page and occupying the smallest storage space among records stored in the compressed data page, each of the records stored in the compressed data page being compressed data written to the compressed data page during one write;

determining a non-compressed data page among the non-compressed data pages for generating second compressed data page, when the remaining storage space in the compressed data page is smaller than the storage space threshold; and compressing the determined non-compressed data page to generate the second compressed data page, such that compressed data corresponding to the to-be-stored data is stored using the generated second compressed data page when compressed data corresponding to the to-be-stored data is written to the compressed data page next time.

8. The apparatus according to claim 7, the operations further comprising:

selecting a compression thread for compressing the non-compressed data page to generate the second compressed data page from pre-created compression threads, when the remaining storage space in the compressed data page is smaller than the storage space threshold.

9. The apparatus according to claim 8, wherein the determining a non-compressed data page among the non-compressed data pages for generating second compressed data page receiving a compression request using the compression thread, the compression request including a data page identifier; and determining the non-compressed data page as the non-compressed data page for generating the second compressed data page, when the data page identifier exists in a non-compressed data page link list and the non-compressed data page corresponding to the data page identifier is not compressed before, wherein the non-compressed data page link list includes a plurality of nodes, and each of the nodes corresponds to the data page identifier of the non-compressed data page.

10. The apparatus according to claim 9, the operations further comprising:

writing the to-be-stored data to a preset non-compressed data page among the non-compressed data pages, after responding to the to-be-stored data to be written to the compressed data page in a cache storage region of a database.

11. The apparatus according to claim 10, the operations further comprising:

receiving an input storage space setting instruction; and setting a storage space size for the non-compressed data page and the compressed data page.

12. A non-transitory computer storage medium, the non-transitory computer storage medium stores a computer readable instruction that can be executed by a processor, when the computer readable instruction is executed by the processor, the processor executes a method for storing data, the method comprising:

judging whether a remaining storage space in a compressed data page is greater than a storage space threshold, in response to to-be-stored data to be written to the compressed data page in a cache storage region of a database, the cache storage region including non-compressed data pages for storing the to-be-stored data and compressed data pages for storing compressed data corresponding to the to-be-stored data, wherein the storage space threshold is greater than a size of a record being written to the compressed data page and occupying the smallest storage space among records stored in the compressed data page, each of the records stored in the compressed data page being compressed data written to the compressed data page during one write;

when the remaining storage space in the compressed data page is smaller than the storage space threshold, determining a non-compressed data page among the non-compressed data pages for generating second compressed data page; and compressing the determined non-compressed data page to generate the second compressed data page, such that compressed data corresponding to the to-be-stored data is stored using the generated second compressed data page when compressed data corresponding to the to-be-stored data is written to the compressed data page next time.

* * * * *